(12) United States Patent
Wang et al.

(10) Patent No.: US 10,346,978 B2
(45) Date of Patent: *Jul. 9, 2019

(54) METHOD AND APPARATUS FOR AREA OR VOLUME OF OBJECT OF INTEREST FROM GASTROINTESTINAL IMAGES

(71) Applicant: CAPSOVISION, INC., Saratoga, CA (US)

(72) Inventors: Kang-Huai Wang, Saratoga, CA (US); Mark Hadley, Los Altos, CA (US); Chenyu Wu, Sunnyvale, CA (US)

(73) Assignee: CapsoVision Inc., Saratoga, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 15/669,853

(22) Filed: Aug. 4, 2017

(65) Prior Publication Data

US 2019/0043188 A1  Feb. 7, 2019

(51) Int. Cl.
*G06T 7/00* (2017.01)

(52) U.S. Cl.
CPC .. *G06T 7/0012* (2013.01); *G06T 2207/10068* (2013.01); *G06T 2207/30092* (2013.01); *G06T 2207/30096* (2013.01)

(58) Field of Classification Search
USPC .......................................................... 348/65
See application file for complete search history.

(56) References Cited

U.S. PATENT DOCUMENTS

| 7,983,458 | B2 | 7/2011 | Wang | |
| 2003/0171652 | A1* | 9/2003 | Yokoi | A61B 1/00036 600/160 |
| 2004/0258328 | A1* | 12/2004 | Adler | A61B 1/041 382/286 |
| 2007/0255098 | A1* | 11/2007 | Wang | A61B 1/041 600/109 |
| 2007/0270642 | A1* | 11/2007 | Bayer | A61B 1/0005 600/109 |
| 2009/0097725 | A1* | 4/2009 | Krupnik | A61B 1/00096 382/128 |
| 2010/0272318 | A1* | 10/2010 | Cabiri | A61B 1/00096 382/106 |
| 2012/0035507 | A1* | 2/2012 | George | A61B 1/00147 600/587 |
| 2012/0092472 | A1* | 4/2012 | Higuchi | A61B 1/00009 348/65 |

(Continued)

OTHER PUBLICATIONS

Warren et al., ("Comparison of One-, Two-, and Three-Dimensional Measurements of Childhood Brain Tumors", Journal of National Cancer Institute, pp. 141-145, vol. 93, No. 18, Sep. 19, 2001).

(Continued)

*Primary Examiner* — Behrooz M Senfi
(74) *Attorney, Agent, or Firm* — Blairtech Solution LLC

(57) ABSTRACT

A method and apparatus for estimating or measuring a physical area or physical volume of an object of interest in one or more images captured using an endoscope are disclosed. According to the present method, an object of interest in an image or images is determined. Also, distance information associated with the object of interest with respect to an image sensor of the endoscope is received. The physical area size or physical volume size of the object of interest is then determined based on the image or images, and the distance information.

20 Claims, 4 Drawing Sheets

(56) References Cited

U.S. PATENT DOCUMENTS

2016/0225150 A1* 8/2016 Wilson ................. A61B 1/041
2017/0046833 A1* 2/2017 Lurie ..................... G06T 19/20

OTHER PUBLICATIONS

Kikuchi et al., (A new staging system based on tumor volume in gastric cancer, Anticancer Research, pp. 2933-2936, vol. 21, No. 4B, Jul.-Aug. 2001).

Chaptini et al, ("Variation in polyp size estimation among endoscopists and impact on surveillance intervals", Gastrointestinal Endoscopy, pp. 652-659, vol. 80, No. 4: 2014).

Plumb et al., ("Terminal digit preference biases polyp size measurements at endoscopy, computed tomographic ,colonography, and histopathology", Endoscopy, pp. 899-908, vol. 48, Oct. 2016).

* cited by examiner

METHOD AND APPARATUS FOR AREA OR VOLUME OF OBJECT OF INTEREST FROM GASTROINTESTINAL IMAGES

CROSS REFERENCE TO RELATED APPLICATIONS

The present invention is related to U.S. patent application Ser. No. 14/884,788, filed on Oct. 16, 2015. The U.S. Patent Application is hereby incorporated by reference in its entirety.

FIELD OF THE INVENTION

The present invention relates to the endoscope for capturing images of human gastrointestinal (GI) tract for diagnosis purpose. In particular, the endoscope is enabled to estimate physical area or physical volume of an object of interest in the GI images.

BACKGROUND AND RELATED ART

Devices for imaging body cavities or passages in vivo are known in the art and include endoscopes and autonomous encapsulated cameras. Endoscopes are flexible or rigid tubes that pass into the body through an orifice or surgical opening, typically into the esophagus via the mouth or into the colon via the rectum. An image is formed at the distal end using a lens and transmitted to the proximal end, outside the body, either by a lens-relay system or by a coherent fiber-optic bundle. A conceptually similar instrument might record an image electronically at the distal end, for example using a CCD or CMOS array, and transfer the image data as an electrical signal to the proximal end through a cable. Endoscopes allow a physician control over the field of view and are well-accepted diagnostic tools.

Capsule endoscope is an alternative in vivo endoscope developed in recent years. For capsule endoscope, a camera is housed in a swallowable capsule, along with a radio transmitter for transmitting data, primarily comprising images recorded by the digital camera, to a base-station receiver or transceiver and data recorder outside the body. The capsule may also include a radio receiver for receiving instructions or other data from a base-station transmitter. Instead of radio-frequency transmission, lower-frequency electromagnetic signals may be used. Power may be supplied inductively from an external inductor to an internal inductor within the capsule or from a battery within the capsule.

An autonomous capsule camera system with on-board data storage was disclosed in the U.S. Pat. No. 7,983,458, entitled "In Vivo Autonomous Camera with On-Board Data Storage or Digital Wireless Transmission in Regulatory Approved Band," granted on Jul. 19, 2011. The capsule camera with on-board storage archives the captured images in on-board non-volatile memory. The capsule camera is retrieved upon its exiting from the human body. The images stored in the non-volatile memory of the retrieved capsule camera are then accessed through an output port on in the capsule camera.

When the endoscope is used for imaging the human GI tract, one of the primary purposes is to identify any possible anomaly. If any anomaly is found, it is further of interest to determine characteristics of the anomaly, such as the size of the anomaly. For example, the polyp size is an important clinical factor associated with surveillance interval decision making for the colonoscopy procedure. Usually, a large polyp size is associated with a higher probability of malignancy. Furthermore, for cancerous tumor, the size will affect the probability of lymphovascular invasion and metastasis, and also impact prognosis substantially. For example, in a technical paper by Warren et al., ("Comparison of One-, Two-, and Three-Dimensional Measurements of Childhood Brain Tumors", *Journal of National Cancer Institute*, pp. 141-145, Vol. 93, No. 18, Sep. 19, 2001), it shows that the tumor lymphovascular metastasis is more closely related to tumor area or volume, i.e. multiple dimensional measurement than a dimensional measurement. Similar observation has also be noted by Kikuchi et al., ("A new staging system based on tumor volume in gastric cancer", *Anticancer Research*, pp. 2933-2936, Vol. 21, No. 4B, July-August 2001).

However in the colonoscopy standard procedure, the polyp size is always measured by its longest dimension. For example, in a technical article by Chaptini et al, ("Variation in polyp size estimation among endoscopists and impact on surveillance intervals", *Gastrointestinal Endoscopy*, pp. 652-659, Volume 80, No. 4: 2014), the polyp size is determined by measuring the size of the open forceps from the printed photograph or images displayed on a display device. Similar size measuring technique has also been mentioned by Plumb et al., ("Terminal digit preference biases polyp size measurements at endoscopy, computed tomographic colonography, and histopathology", *Endoscopy*, pp. 899-908, Vol. 48, October 2016).

It is desirable to develop techniques that can easily measure or estimate the physical area or physical volume of an object of interest.

BRIEF SUMMARY OF THE INVENTION

A method and apparatus for estimating or measuring a physical area or physical volume of an object of interest in one or more images captured using an endoscope are disclosed. According to the present method, an object of interest in an image or images is determined. Also, distance information associated with the object of interest with respect to the endoscope is received. The physical area size or physical volume size of the object of interest is then determined based on the image or images, and the distance information.

In one embodiment, the physical area size of the object of interest is proportional to a product of a first physical dimension of the object of interest and a second physical dimension of the object of interest. A first direction aligned with a longest straight line from one end of the object of interest to another end of the object of interest is determined. The first physical dimension of the object of interest is estimated based on the longest straight line measured from said one or more images scaled by a magnification factor associated with optical configuration of the image sensor of the endoscope. A second physical dimension of the object of interest based on a second measured longest length of the object of interest in a second direction scaled by the magnification factor, wherein the second direction is perpendicular to the first direction.

In another embodiment, said determining an object of interest comprising outlining a boundary of the object of interest by a user or an artificial intelligence process, or jointly by the user and the artificial intelligence process. For example, said outlining a boundary of the object of interest can be performed by the user using an input device to indicate the boundary of the object of interest in said one or more images displayed on a display device. If the object of interest crosses a boundary of a current image into one or more neighboring images, the current image and said one or more neighboring images can be stitched prior to said determining physical area size or physical volume size of the object of interest. In this case, the object of interest can be outlined in the current image and said one or more neighboring images to assist stitching the current image and said one or more neighboring images.

Said determining an object of interest may comprise indicating the object of interest by a user via a computer input device or by executing program codes on a computer. Furthermore, said indicating the object of interest may comprise generating an outline around the object of interest or changing a color or shade of the object of interest. The object of interest may correspond to a lesion, pedunculated polyp, sessile serrated polyp, flat lesion or an infected area by Crohn's disease.

In another embodiment, a score board is generated for an anomaly as an indication of condition of the anomaly by using an aggregate number corresponding to an average area or percentage of one or more target objects of interest in one or more images representing a section of GI tract, and wherein said one or more target objects of interest correspond to one or more infected areas in the GI tract associated with the anomaly. The section of GI tract may correspond to small bowel, colon or both. According to another embodiment, the disease state is indicated by an index number proportional to the sum of infected areas in the total images in a GI section divided by the sum of image areas of images in the section.

The physical volume size of the object of interest can be derived based on a 3D mathematical model for an anomaly and measured 1D or 2D size information for the object of interest, and wherein the 3D mathematical model is used to predict depth of the object of interest under a surface of the object of interest. The 3D mathematical model may correspond to an ellipsoid, ovoid, sphere, disc or more complicate D shapes. Also, different types of lesions may use different mathematical models.

The physical area size or the physical volume size of the object of interest can be derived based on the distance information derived at a set of point locations by projecting structured lights onto a wall of a lumen of the GI tract. A triangle mesh is generated to cover a topographic surface of the object of interest and the triangle mesh consists of a set of triangles generated using the set of point locations. An outline identifying the object of interest can be projected onto the triangle mesh and projected area of a target set of triangles within the outline projected can be determined as the physical area size of the object of interest. A vector sum of target triangles of the target set of triangles can be calculated and each vector area associated with each target triangle corresponds to a product of area and normal vector of each target triangle. In one embodiment, a 3D shape model is assumed for the object of interest and the physical volume size of the object of interest is estimated based on a measured 1D or 2D size information for the object of interest.

DETAILED DESCRIPTION OF THE INVENTION

Figure 1A:
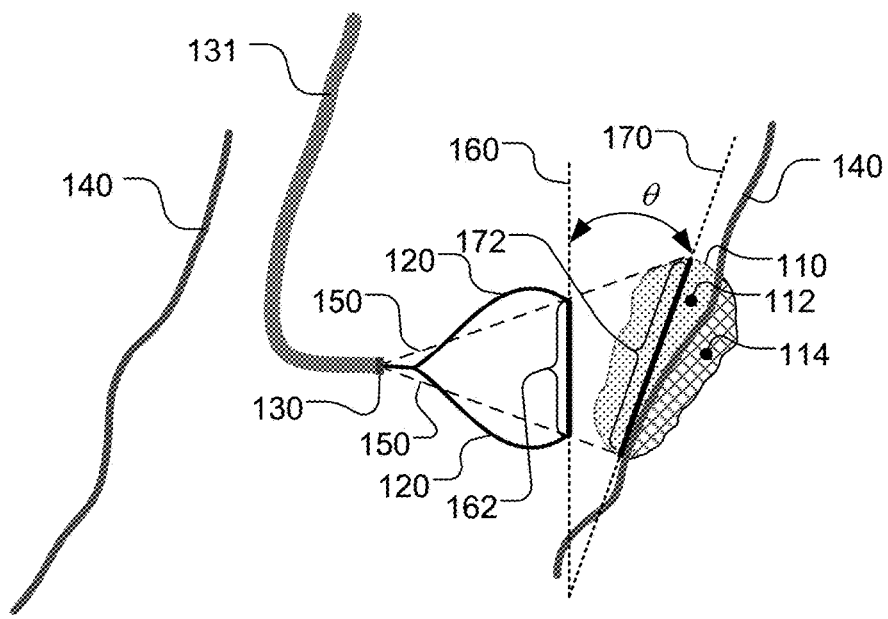
FIG. 1A illustrates an example of measuring the longest dimension of a tumor using a forcipes, where an angle exists between the image plane and the object plane.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention. References throughout this specification to "one embodiment," "an embodiment," or similar language mean that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention. The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

Endoscopes are normally inserted into the human body through a natural opening such as the mouth or anus. Therefore, endoscopes are preferred to be small sizes so as to be minimally invasive. As mentioned before, endoscopes can be used for diagnosis of human gastrointestinal (GI) tract. The captured image sequence can be viewed to identify any possible anomaly. For example, polyp is an anomaly that a doctor often looks for during the colonoscopy procedure. The polyp size is an important clinical factor associated with surveillance interval decision making for the colonoscopy procedure. Moreover Crohn's disease is more prevalent in the western world. The diagnosis and follow-up of the disease state include endoscope direct visualization of mucosa surface in the upper and lower gastrointestinal tracts. However, the gastroenterologist has to insert and maneuver the endoscope through the convoluted human intestine laboriously in order to observe the mucosa surface and obtain a subject impression of the disease condition, such as how prevalent the inflammation condition is inside the GI tract. Alternatively, an ingestible capsule endoscope can be used to examine the GI tract.

If any anomaly is found, it is of interest to identify the characteristics of the anomaly. There exists a significant unmet need to assess area or volume of an object of interest in the GI tract. This assessment is confounded by a few issues in the current state of the art endoscope technology. The measurement currently is always one dimensional, which uses a device of known size (e.g. a forcipes) to align and to get close to the polyp. The forcipes is aligned with its longest dimension to estimate the polyp size by comparison with the forcipes of known size. However the endoscope comprises a flexible cable and when inserted inside a tortuous intestine, the precise maneuver could not be done with ease and precision. Even if alignment with the longest dimension is successful, usually there will be an angle between the longest dimension of the tumor and the forcipes. For an ingestible capsule, the maneuver is out of question.

Moreover, the lesion might not be on the same plane. For example, in the case of a flat lesion in colon or the inflammation in the case of Crohn's disease, this makes the accurate measurement untenable.

Figure 1B:
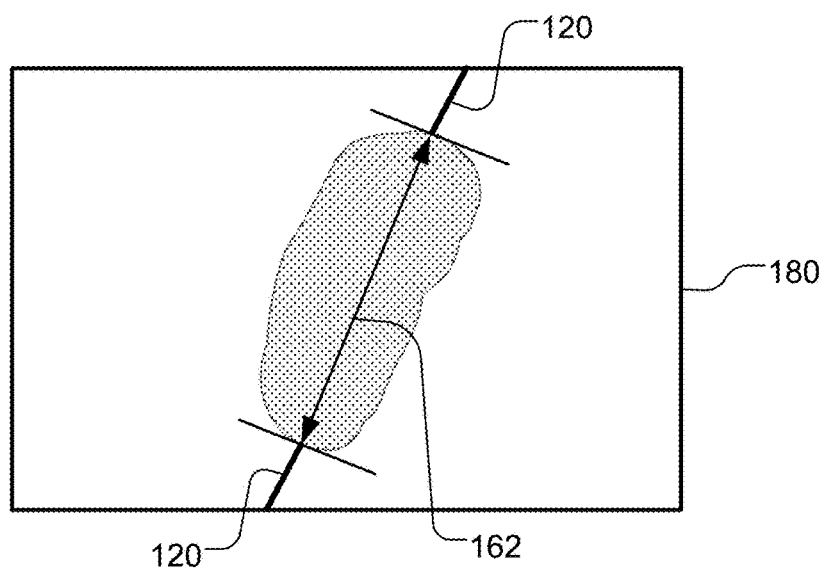
FIG. 1B illustrates an example of measuring the longest dimension of an object of interest using a forcipes to align with the longest dimension of the tumor as seen from an endoscope image.

FIG. 1A illustrates a cross section view for an example of measuring the longest dimension of a tumor 110 using a forcipes 120. The distal end 130 of the endoscope snake cable 131 is inserted into the GI tract, where lines 140 indicate the mucosal surface. Part of the tumor (112) is above the mucosal surface 140 and part of the tumor (114) is underneath the mucosal surface. Furthermore, the distal end 130 has a camera and LED light (not explicitly shown) to capture images. Also, there is an opening at the distal end to allow forcipes 120 to extend out for size measurement. The forcipes is aligned with the longest dimension of the tumor to estimate the tumor size. In FIG. 1A, dash lines 150 indicate the alignment of the tips of forcipes 120 with the longest dimension of the tumor as seen from the endoscope image 180 in FIG. 1B. However, the image plane 160 and the object of inter plane 170 may not be aligned. In FIG. 1A, there is an angle θ between the image plane and the object of interest plane. The measured longest dimension 162 is shorter than the physical longest dimension 172 as shown in FIG. 1A.

In order to overcome the deficiencies in the conventional size measurement of an object of interest, an invention of the present invention discloses an endoscope system that allows a user to easily measure the area or volume of an anomaly. According to the present invention, an endoscope, tethered or untethered such as an ingestible capsule, with distance measurement capability is disclosed to overcome the above issues existing in the state of the art in diagnosis.

In PCT Patent Application, Ser. No. PCT/US17/15668, filed on Jan. 30, 2017, a method to measure 1D size of an object of interest from the captured image and distance information has been disclosed. The method according to PCT/US17/15668 relieves the needs for the laborious procedure requiring a forcipes in the conventional approach. According to PCT/US17/15668, the true size of an object of interest can be estimated from the measured size in the captured image and a determined object distance. In an endoscope, the focal length is known by design. If the distance (also named as object distance in this disclosure) between an object and the camera can be determined, the dimensions of an object can be determined simply using geometry.

Figure 2:
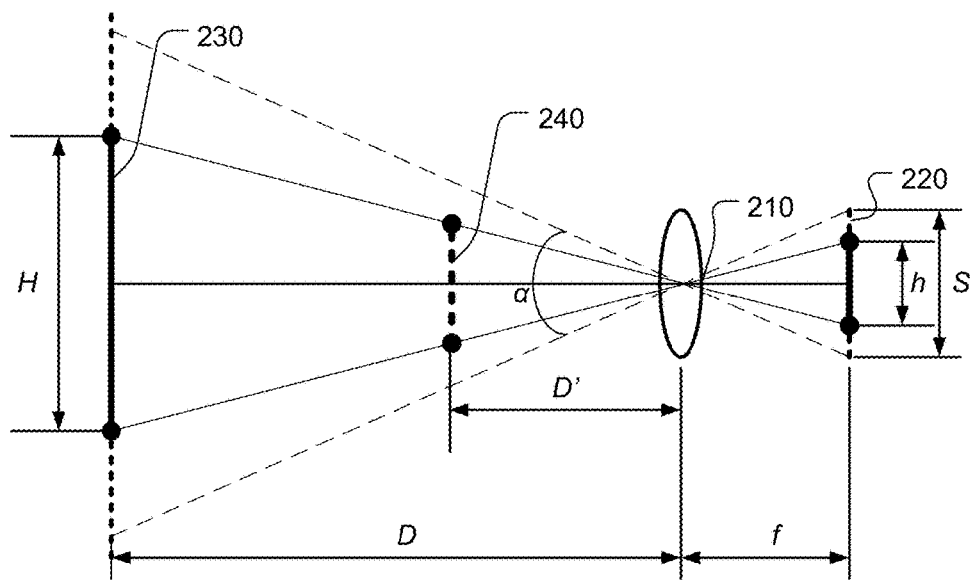
FIG. 2 illustrates a simplified example of object dimension determination based on object-camera distance.

FIG. 2 illustrates a simplified example of object dimension determination based on object-camera distance. In a camera system, the image sensor is placed at the focal plane 220 behind the lens 210. The camera can capture a scene within the field of view extending an angle α. The focal length f is the distance between the lens and the image sensor. The focal length often is fixed for endoscopic applications and is known by design. However, when a capsule endoscope travels through the GI tract, the object distance D varies depending on the location of the capsule endoscope and its relative angles with respect to the GI wall being imaged. If the distance D is known, the dimension of an object can be determined from the captured image by measuring the size of the object image in the image. For example, if an object 230 with height H is at distance D from the camera, the object image height H can be derived from the object image height h in the image according to:

$$H = \left(\frac{D}{f}\right)h. \quad (1)$$

In the above equation, h is measured from the image, the focal length f is known by design, and the distance D is determined by a selected distance measuring means as mentioned above. Accordingly, if the distance can be determined, the object dimensions can be derived. The object size in the image can be measured in physical dimension. However, the image is captured digitally and the size measurement may be more convenient in terms of the number of pixels. Since the physical dimension of image sensor surface and the optical footprint are known. Also, the number of pixels is known (e.g. 320×240). Therefore, the object image size in the image can be measured in a number of pixels and converted physical object image size in the image. For convenience, the ratio D/f is referred as magnification factor.

As shown above, the object image size in the image depends on the actual object size and its distance from the camera. A smaller object at a closer distance may appear to have the same size in the image as a larger object at a farther distance. For example, the object 240, which is smaller but closer than object 230, appears to have the same height as object 230 in the image. Therefore, the distance is crucial information for determining the object size. Accordingly, the distance measuring means disclosed above enables object size determination based on the images captured using an endoscope.

In one embodiment of the present invention, the boundary of the lesion is outlined first. The method based on this embodiment identifies the first longest dimension and measure its length according to the information of distance and magnification of the imager. Since the endoscope image plane may not be aligned with the lesion plane well, the distance information from a multiple point in the field of view may be required.

For the embodiment above, the present method may further provide a tool to find the second longest dimension in the direction perpendicular to the direction of the first longest dimension. The 2D measurement of the lesion can be expressed as the product of the first longest dimension and the second longest dimension that are derived above with the 1D dimension information as a by-product in the process.

In another embodiment, a method according to this embodiment provides a tool to measure the real area accurately by using a variety of area measuring methods, such as using grids.

In yet another embodiment, a method according to this embodiment allows a user (e.g. a doctor or a medical professional), an algorithm implemented in computer/software codes or both to outline the lesion in the image. For example, a medical professional may draw the outline on a touch screen that displays the GI image being examined. A computer may run a program trained by deep learning to automatically draw the outline of a lesion. In yet another example, a doctor may point to a location on the lesion in the image and the computer with AI (artificial intelligence) may take over to finish the outlining automatically. The use of deep learning or artificial intelligence to perform various image processing tasks (e.g. pattern recognition) is well known in the field. The details are not repeated here.

For the GI image, each image typically covers limited a field of view. Therefore, it may occur that a tumor, especially the Crohn's disease inflammation, may cross the image boundaries. The whole tumor may spread over a number of images. According to one embodiment of the present invention, image stitching is performed first and area or volume measurement is performed based on the stitched image.

While fully automated area or volume measure of an object of interest is feasible, the system may perform faster or more reliably with some degree of human assistance. For example, the stitching across multiple images may be assisted by the outlining boundaries of the lesion, which can be designated as a "feature". The method then estimates the size or volume of the "feature".

During the process of estimating the area or volume based on stitched image, a score board can be kept by using an aggregate number. The aggregate number may correspond to an average area or percentage of infected area per image. The aggregate number may also be calculated for each area (e.g. aggregated areas of all images) calculated through a section of the GI tract, such as the small bowel, ileum, colon, etc. Therefore, the disease state can be indicated by an index number proportional to the sum of infected areas in the total images in a GI section divided by the sum of image areas of images in the section.

The 3D size (i.e., the volume) may be calculated based on a mathematical model for each type of lesion, pedunculated polyp, sessile serrated polyp, flat lesion, etc. This model may predict the depth of the lesion under the surface, which is useful in the assessment of probability of metastasis.

Figure 3:
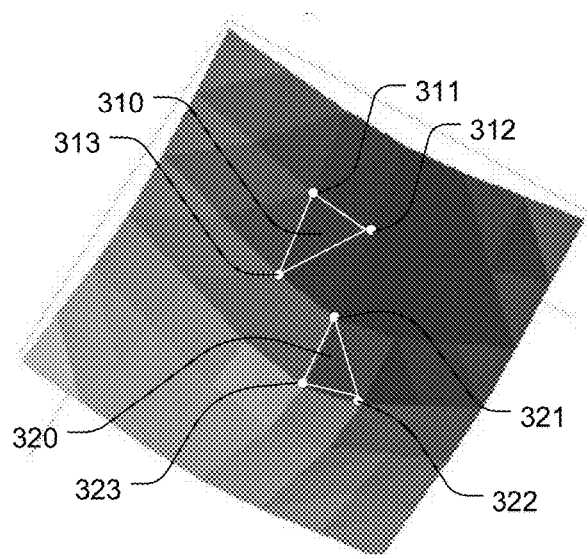
FIG. 3 illustrates an example of a triangle mesh formed from the structured light points.

According to another embodiment of the present invention, structured light is used to estimate the 3D size. For example, a number of point locations in 3D can be obtained by using structured light, where the structured light ray intersects with the walls of the lumen. An approximate continuous depth map can be formed by connecting the known points together in a triangle mesh. FIG. 3 illustrates an example of a triangle mesh formed from the structured light points. For example, triangle 310 is formed from three structured light points 311, 312 and 313. Triangle 320 is formed from three structured light points 321, 322 and 323. The triangle mesh is formed similar to Delaunay triangulation. Each of the triangles formed is a flat plane surface intersecting with the three points that comprise the triangles vertices. The plane can be found by interpolating the three depth values.

The normal intensity/color image may show a feature, which can be encircled by a user or a software tool. The algorithm below illustrates an example used to calculate the silhouette area or shadow area of this feature.

Figure 4:
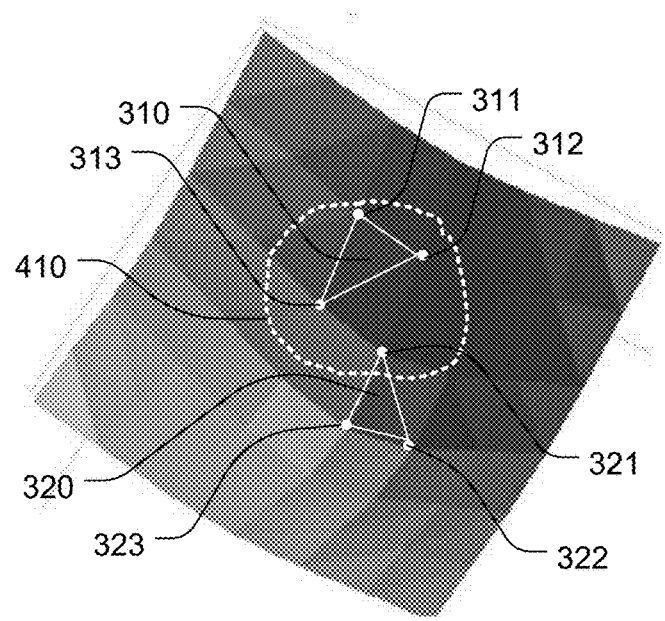
FIG. 4 illustrates a free hand loop indicating a feature can be projected onto the triangle mesh.

A free hand loop 410 to indicate a feature can be projected onto the triangle mesh as shown in FIG. 4. The area component from each triangle can be found by simply determining the 2D intersection area of the triangle and the projected free hand loop.

Figure 5:
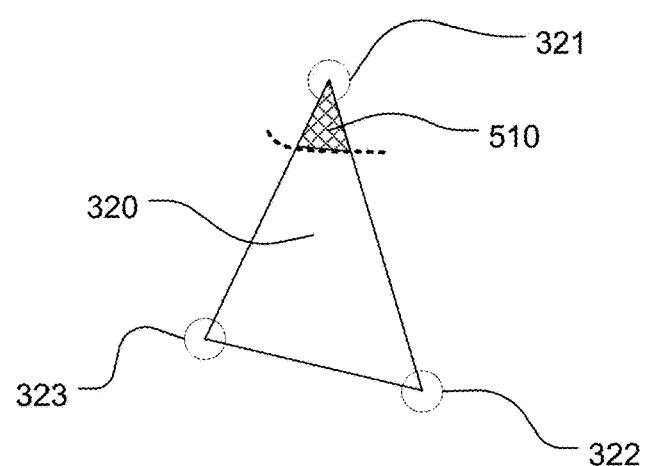
FIG. 5 illustrates an example that a portion of a triangle inside the free hand loop is indicated by the hatch-line filled area.

A triangle (i.e., 320) across the free hand loop as shown in FIG. 4 contributes partially to the area size estimation. For triangle 320, only the portion inside the free hand loop 410 is counted for area calculation. The portion inside the free hand loop 410 is indicated by the hatch-line filled area 510 in FIG. 5. A triangle (e.g. triangle 310) may also be entirely in the interior of the free hand loop. In this case, the triangle contributes the entire area to the area size calculation. On the other hand, a triangle may be on the exterior of the free hand loop and does not contribute to the area size at all.

A projected area $A_{eff}$ of the tumor can be defined as:

$$A = \sum_i^n A_i * \hat{n}_i$$

A is the vector sum of the area each triangle intersection area (i.e., $A_i$) multiplying its normal vector $\hat{n}_i$, where $|\hat{n}_i|=1$.

A projected area $A_{eff}$ can be determined from:

$$A_{eff}=|A|$$

In yet another implementation, a projected area $A_{eff}$ can be determined from:

$$A_{eff} = \sum_i^n A_i$$

The area derived as above is a better measurement of the size of a tumor than the simply linear (i.e., 1D) dimension for indicating disease state.

In yet another embodiment, the feature is assumed to fit a shape (e.g. ellipsoid, ovoid, sphere, disc or more complicate 3D shapes.). Therefore, the volume for the feature can be estimate from the shape assumption and parameter(s) associated with the shape.

Figure 6:
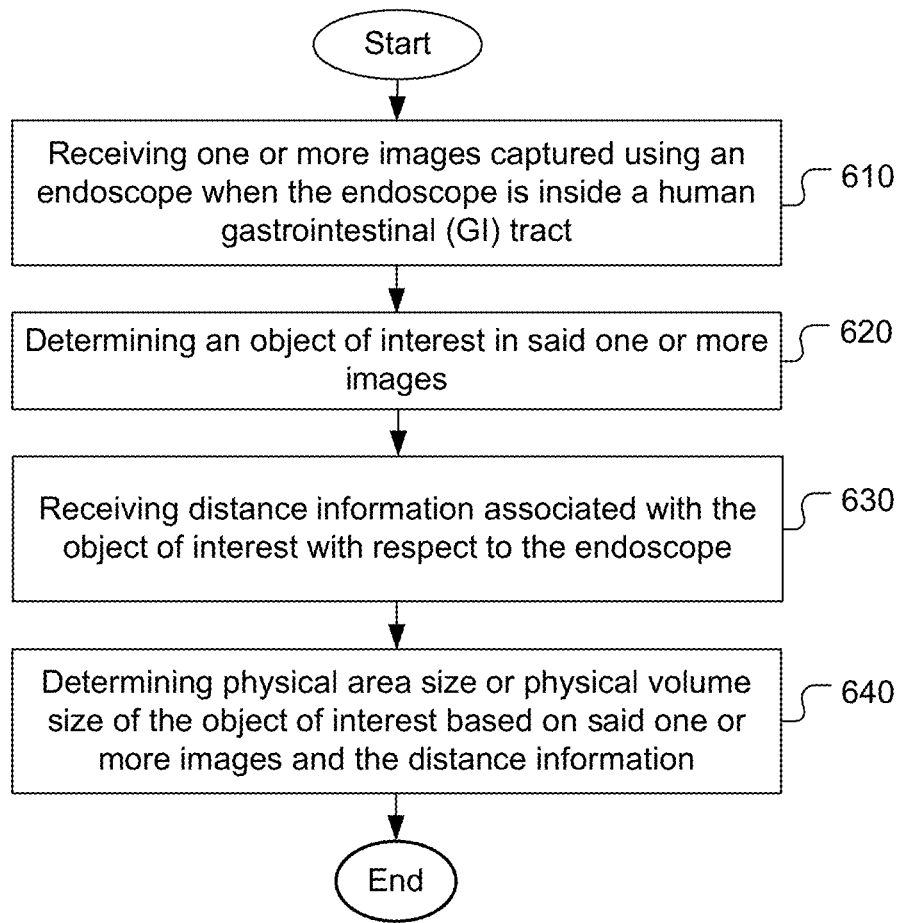
FIG. 6 illustrates an exemplary flowchart for estimating or measuring a physical area or physical volume of an object of interest in one or more images captured using an endoscope according to an embodiment of the present invention.

FIG. 6 illustrates an exemplary flowchart for estimating or measuring a physical area or physical volume of an object of interest in one or more images captured using an endoscope according to an embodiment of the present invention. One or more images captured using an endoscope, when the endoscope is inside a human gastrointestinal (GI) tract, are receiving in step 610. An object of interest in said one or more images is determined in step 620. Distance information associated with the object of interest with respect to the endoscope is also received in step 630. Physical area size or physical volume size of the object of interest is determined based on said one or more images and the distance information in step 640.

The above description is presented to enable a person of ordinary skill in the art to practice the present invention as provided in the context of a particular application and its requirements. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of estimating or measuring a physical area or physical volume of an object of interest in one or more images captured using a capsule endoscope, the method comprising:
receiving one or more images captured using a capsule endoscope when the capsule endoscope is inside a human gastrointestinal (GI) tract;
determining an object of interest in said one or more images, wherein the object of interest corresponds to a target object on a wall of lumen of the human GI tract;
deriving distance information associated with the object of interest with respect to the capsule endoscope by projecting structured light onto the wall of lumen of the human GI tract; and
determining physical area size or physical volume size of the object of interest based on said one or more images and the distance information, and wherein said determining physical area size or physical volume size of the object of interest comprises:
determining a first direction aligned with a longest straight line from one end of the object of interest to another end of the object of interest;
estimating a first physical dimension of the object of interest based on the longest straight line measured from said one or more images scaled by a magnification factor associated with optical configuration of an image sensor of the capsule endoscope; and
estimating a second physical dimension of the object of interest based on a second measured longest length of the object of interest in a second direction scaled by the magnification factor, wherein the second direction is perpendicular to the first direction; and
wherein the physical area size of the object of interest is proportional to a product of the first physical dimension of the object of interest and the second physical dimension of the object of interest.

2. The method of claim 1, wherein said determining an object of interest comprising outlining a boundary of the object of interest by a user or an artificial intelligence process or jointly by the user and the artificial intelligence process.

3. The method of claim 2, wherein said outlining a boundary of the object of interest is performed by the user using an input device to indicate the boundary of the object of interest in said one or more images displayed on a display device.

4. The method of claim 2, wherein if the object of interest crosses a boundary of a current image into one or more neighboring images, the current image and said one or more neighboring images are stitched prior to said determining physical area size or physical volume size of the object of interest.

5. The method of claim 4, wherein the object of interest is outlined in the current image and said one or more neighboring images to assist stitching the current image and said one or more neighboring images.

6. The method of claim 1, wherein said determining an object of interest comprises outlining a boundary of the object of interest automatically using image processing.

7. The method of claim 1, wherein said determining physical area size or physical volume size of the object of interest is performed automatically using computer executable codes executed on a computing device.

8. The method of claim 1, wherein the object of interest corresponds to a lesion, pedunculated polyp, sessile serrated polyp, flat lesion or an infected area by Crohn's disease.

9. A method of estimating or measuring a physical area or physical volume of an object of interest in one or more images captured using a capsule endoscope, the method comprising:
receiving one or more images captured using a capsule endoscope when the capsule endoscope is inside a human gastrointestinal (GI) tract;
determining an object of interest in said one or more images, wherein the object of interest corresponds to a target object on a wall of lumen of the human GI tract;
deriving distance information associated with the object of interest with respect to the capsule endoscope by projecting structured light onto the wall of lumen of the human GI tract; and
determining physical area size or physical volume size of the object of interest based on said one or more images and the distance information; and
wherein a score board is generated for an anomaly as an indication of condition of the anomaly by using an aggregate number corresponding to an average area or percentage of one or more target objects of interest in one or more images representing a section of GI tract, and wherein said one or more target objects of interest correspond to one or more infected areas in the human GI tract associated with the anomaly.

10. The method of claim 9, wherein the section of GI tract corresponds to a part of small bowel, a part of colon or both.

11. A method of estimating or measuring a physical area or physical volume of an object of interest in one or more images captured using a capsule endoscope, the method comprising:
receiving one or more images captured using a capsule endoscope when the capsule endoscope is inside a human gastrointestinal (GI) tract;
determining an object of interest in said one or more images, wherein the object of interest corresponds to a target object on a wall of lumen of the human GI tract;
deriving distance information associated with the object of interest with respect to the capsule endoscope by projecting structured light onto the wall of lumen of the human GI tract; and
determining physical area size or physical volume size of the object of interest based on said one or more images and the distance information; and
wherein an index number is generated for an anomaly as an indication of a disease state for the anomaly, and wherein the index number is proportional to a sum of infected areas in said one or more images in a GI section divided by a sum of total image areas in said one or more images in the GI section.

12. The method of claim 1, wherein the object of interest corresponds to an anomaly and the physical volume size of the object of interest is derived based on a 3D mathematical model for the anomaly and measured 1D or 2D size information for the object of interest, and wherein the 3D mathematical model is used to predict depth or volume of the anomaly underneath a mucosal surface.

13. The method of claim 12, wherein the 3D mathematical model corresponds to an ellipsoid, ovoid, sphere or disc.

14. A method of estimating or measuring a physical area or physical volume of an object of interest in one or more images captured using a capsule endoscope, the method comprising:
   receiving one or more images captured using a capsule endoscope when the capsule endoscope is inside a human gastrointestinal (GI) tract;
   determining an object of interest in said one or more images, wherein the object of interest corresponds to a target object on a wall of lumen of the human GI tract;
   deriving distance information associated with the object of interest with respect to the capsule endoscope by projecting structured light onto the wall of lumen of the human GI tract; and
   determining physical area size or physical volume size of the object of interest based on said one or more images and the distance information; and
   wherein the physical area size or the physical volume size of the object of interest is derived based on the distance information derived at a set of point locations by projecting structured lights onto a wall of a lumen of the human GI tract;
   wherein a triangle mesh is generated to cover a topographic surface of the object of interest, and wherein the triangle mesh consists of a set of triangles generated using the set of point locations; and
   wherein an outline identifying the object of interest is projected onto the triangle mesh and projected area of a target set of triangles within the outline projected is determined as the physical area size of the object of interest.

15. The method of claim 14, wherein a vector sum of target triangles of the target set of triangles is calculated, and wherein each vector area associated with each target triangle corresponds to a product of area and normal vector of each target triangle.

16. The method of claim 14, wherein a 3D shape model is assumed for the object of interest and the physical volume size of the object of interest is estimated based on a measured 1D or 2D size information for the object of interest.

17. The method of claim 1, wherein said determining an object of interest in said one or more images comprises indicating the object of interest by a user via a computer input device or by executing program codes on a computer.

18. The method of claim 17, wherein said indicating the object of interest comprises generating an outline around the object of interest or changing a color or shade of the object of interest.

19. The method of claim 18, wherein the program codes include routines to utilize deep learning or artificial intelligence to automatically generate the outline around the object of interest.

20. An apparatus for estimating or measuring a physical area or physical volume of an object of interest in one or more images captured using a capsule endoscope, the apparatus comprising one or more electronic circuits or processors arranged to:
   receive one or more images captured using a capsule endoscope when the capsule endoscope is inside a human gastrointestinal (GI) tract;
   determine an object of interest in said one or more images, wherein the object of interest corresponds to a target object on a wall of lumen of the human GI tract;
   derive distance information associated with the object of interest with respect to the capsule endoscope by projecting structured light onto the wall of lumen of the human GI tract;
   determine a first direction aligned with a longest straight line from one end of the object of interest to another end of the object of interest;
   estimate a first physical dimension of the object of interest based on the longest straight line measured from said one or more images scaled by a magnification factor associated with optical configuration of an image sensor of the capsule endoscope; and
   estimate a second physical dimension of the object of interest based on a second measured longest length of the object of interest in a second direction scaled by the magnification factor, wherein the second direction is perpendicular to the first direction; and
   determine a physical area size of the object of interest according to a product of the first physical dimension of the object of interest and the second physical dimension of the object of interest.

* * * * *